Nov. 1, 1966 C. D. MURDOCH 3,282,523

MAGNETIC TAPE APPARATUS

Filed March 6, 1964

2 Sheets-Sheet 1

INVENTOR.
COLIN D. MURDOCH
BY
Wallace, Kinzer & Dorn
Att'ys

Nov. 1, 1966 C. D. MURDOCH 3,282,523

MAGNETIC TAPE APPARATUS

Filed March 6, 1964

2 Sheets-Sheet 2

INVENTOR.
COLIN D. MURDOCH

BY
Wallace, Kinzer & Dorn
Attys 3,282,523

MAGNETIC TAPE APPARATUS

Colin D. Murdoch, Union City, Calif., assignor of twenty percent to Chad W. Pennebaker, San Leandro, Calif.

Filed Mar. 6, 1964, Ser. No. 349,810
3 Claims. (Cl. 242—55.13)

This invention relates to a new and improved tape system for magnetic tape recording and reproducing equipment and more specifically to a new and improved magnetic tape cartridge, cartridge mount, and associated tape drive. The invention is particularly valuable as applied to magnetic tape recording systems requiring only relatively small storage volume, such as dictating systems, business machine control systems, and the like.

There are a number of different applications for magnetic tape recording apparatus which do not require particularly large storage tapes. Dictating machines, tape recorders for home use, control systems for typewriters and other small business machines, and other applications frequently are based upon the use of a number of individual magnetic tapes of relatively short length, as contrasted with the long continuous tapes required for video recordings, computer storage, and the like. In these short-tape applications, it is usually necessary and desirable to provide for quick and convenient change of tapes. For example, in a tape recorder intended for home entertainment use, an individual tape may contain a single symphony or a limited number of musical selection numbers and it is usually desirable to provide for an exchange of tapes, in the recording and reproducing equipment, without requiring adjustment of the equipment and without substantial difficulty in the replacement operation.

In most of the short-tape applications, as known heretofore, provision is made for storing each individual tape in a self-contained cartridge, and this approach is followed in connection with the present invention. With previously known cartridges, it has usually been necessary to provide a displaceable pressure member, known as a pad, for maintaining the tape in contact with an electromagnetic transducer or head at the point at which data are magnetically recorded on or reproduced from the tape. This pad or pressure member must be displaced from the recording and reproducing head of the magnetic system in order to permit replacement of the tape cartridge, and means must be afforded for actuating the pad between its normal operating position and a displaced tape replacement position.

A particular problem, with respect to replacement of tape cartridges in systems of this kind, arises from the fact that the cartridges are generally of rather inexpensive construction. With such inexpensive cartridges, it is frequently difficult to maintain the cartridge dimensions with sufficient precision to permit accurate mounting on the tape drive spindles of the magnetic recording and reproducing apparatus. This is especially true where registration of the cartridge is effected by engaging the cartridge housing with a plurality of locating members that are a part of the tape drive mechanism.

It is an object of the present invention, therefore, to provide a new and improved magnetic tape system for short-tape applications that permits storage of the tapes in individual inexpensive cartridges, yet allows removal and replacement of the cartridges without requiring displacement of a movable pressure pad or other similar element of the magnetic recording and reproducing apparatus.

A specific object of the invention is to provide a new and improved magnetic tape system, using a series of magnetic tapes stored in individual cartridges, that enables removal and replacement of a tape cartridge by direct withdrawal from the tape drive apparatus and direct replacement in that apparatus and requires no displacement or actuation of any element of the tape drive apparatus itself.

Another object of the invention is to provide for precise and accurate location of a magnetic tape cartridge in a magnetic tape recording and reproduction device without imposing close tolerance requirements on the cartridge housing or on the operating elements of the tape drive apparatus. A particular feature of the present invention, relating to this object, is the provision of a tape cartridge construction in which individual tape storage and take-up reels are floatingly mounted in a cartridge housing in a manner that permits limited movement of the reels within the housing, together with a mounting arrangement that mounts the reels directly on the drive spindles of a tape deck without reference to precision positioning of the housing.

Another object of the invention is to provide a new and improved means for determining the end of a magnetic tape, where the tape is mounted in a self-contained cartridge, without requiring any switching mechanism in the cartridge and with no electrical connection to the cartridge itself.

A further object of the invention is to afford a new and improved unified tape drive for two cartridges, in a single magnetic tape recording and reproducing system operable in response to data recorded on both cartridges, where the data may be taken from either cartridge at any given time.

A specific object of the invention is to afford a new and improved tape drive and tape cartridge mounting arrangement for a magnetic recording and reproducing system in which all operating components are suspended from a relatively rigid deck entirely independent of a decorative cover that may be utilized for the deck.

An additional object of the invention is to afford a new and improved means for accurately locating a tape cartridge on a tape deck, utilizing a permanent magnet as an integral part of the locating means.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

Figures 1, 2, 2A:
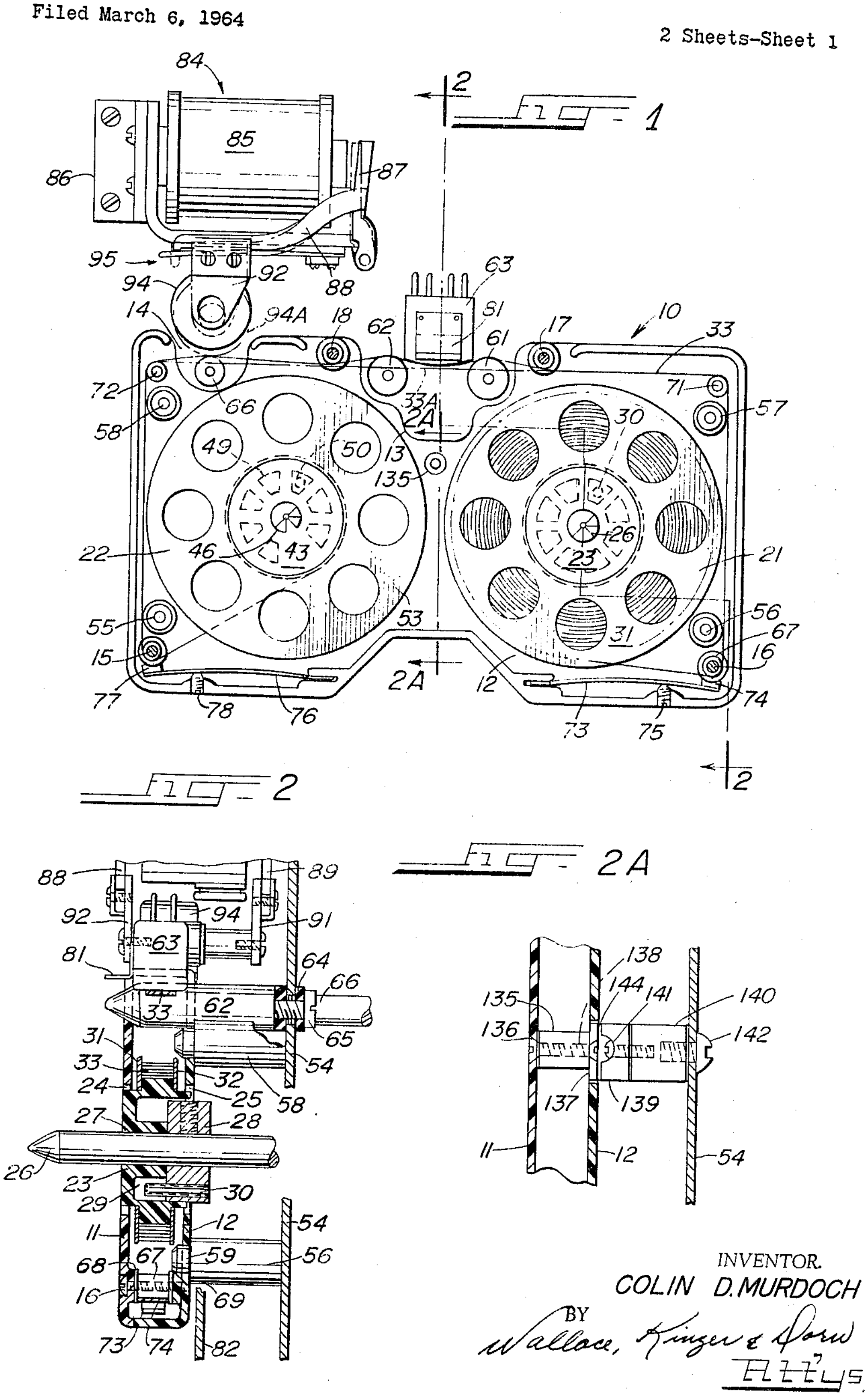
FIG. 1 is an elevation view of a tape cartridge, and a part of a tape drive system, constructed in accordance with a preferred embodiment of the present invention, the cover of the cartridge having been removed to show the internal construction of the cartridge.
FIG. 2 is a sectional view taken approximately along line 2—2 in FIG. 1.
FIG. 2A is a detail section view taken approximately along line 2A—2A in FIG. 1.

The tape cartridge 10 shown in FIGS. 1 and 2 comprises a two-part plastic housing including a front housing section or cover 11 (FIG. 2) and a rear housing section or base 12 (FIGS. 1 and 2). The cartridge is generally rectangular in configuration but is provided with a central neck section 13 of reduced width that is open at the top and an additional opening or slot 14 located in the upper left-hand corner of the cartridge. The two sections 11 and 12 of the cartridge housing may be formed from a suitable molded plastic, such as polystyrene or the like. The two halves of the housing are held together, when the cartridge 10 is assembled, by a series of four retaining screws or like members 15, 16, 17 and 18 mounted in suitable bosses in the two halves of the cartridge housing. The mounting arrangement for retaining screw 16, shown in detail in the lower portion of FIG. 2, is typical.

There are two tape reels mounted within the housing 11, 12 of cartridge 10. Thus, the right-hand portion of cartridge 10 encompasses a tape storage reel 21, whereas a similar take-up reel 22 is mounted in the left-hand portion of the cartridge housing (see FIG. 1). Reel 21 comprises a central hub 23, preferably of molded plastic, that is thick enough to project into two aligned openings 24 and 25 in the front and rear housing sections 11 and 12 respectively (see FIG. 2). The housing openings 24 and 25 are both somewhat larger than the diameter of reel hub 23, so that the reel hub is free to move laterally to, a limited extent, within the cartridge housing. Hub 23 is provided with a central bore 27 for receiving a spindle 26. A collar 28 mounted on the spindle is seated within the base portion of hub 23; a set screw or other suitable mounting means may be employed to fix the collar on the spindle. To afford a driving connection between spindle 26 and hub 23, the hub is provided with a series of rearwardly facing apertures 29, any one of which may receive a drive pin 30 that is affixed to the hub 28 on the spindle.

Storage reel 21 further includes a pair of flanges 31 and 32 between which a magnetic tape 33 is stored. Flanges 31, 32 are preferably formed of sheet aluminum or other lightweight metal, securely bonded to hub 23. An all metal or all plastic construction can be adopted for the tape reels if desired.

The internal separation between flanges 32 and 33 is determined, of course, by the width of the magnetic tape 33. The overall axial thickness of the storage reel 21, taken across flanges 32 and 33, is made less than the space between the front and rear housing walls 11 and 12, so that the storage reel is free to move, to a limited extent, axially of spindle 26, within the cartridge housing, in addition to the limited freedom of movement normal to the axis of the spindle permitted by the oversize hub openings 24 and 25 in the cartridge housing.

The construction and mounting for take-up reel 22 are essentially similar to the construction and mounting for storage reel 21. Thus, take-up reel has a central hub 43 that is engageable with a drive spindle 46. The take-up reel hub is provided with a series of rearwardly facing slots or openings 49, any one of which may receive a drive pin 50 mounted on a suitable collar on spindle 46. The take-up reel is provided with a pair of flanges, only the front flange 53 being illustrated in the drawings. As in the case of the storage reel, the dimensions of the reel hub 43 and the flanges of the reel are such that the reel is permited limited axial and lateral movement within the cartridge housing.

In addition to the cartridge 10, FIGS. 1 and 2 show a part of the tape drive upon which the cartridge is mounted for operation. The tape deck includes a rigid support member 54, the structural base of the tape drive mechanism, through which spindles 26 and 46 project into engagement with the two tape reels, and specifically hubs 23 and 43. The support member or base plate 54 has four mounting posts or pins 55, 56, 57 and 58 affixed thereto, these mounting pins projecting outwardly of the base plate and being received in suitable locating apertures in housing base 12 near the four corners of the cartridge housing.

The mounting of the cartridge on the post 56 is shown in detail in FIG. 2. As illustrated therein, the outer portion of post 56 is provided with a reduced diameter section 59, affording a locating shoulder that bears against the rear face of the housing member 12. It is the reduced diameter portion 59 of the mounting post that projects through the housing member 12. This portion of the post is preferably provided with a tapered or chamfered outer end to facilitate locating the cartridge housing on the mounting post. A similar mounting arrangement is used with respect to the other mounting pins 55, 57 and 58.

The portion of the tape deck illustrated in FIGS. 1 and 2 further includes a pair of guide pins 61 and 62 flanking a transducer head 63. As shown in FIG. 2, guide pin 62 is mounted upon base plate 54 by means of an insulator bushing 64 that electrically insulates the pin from the base plate. Preferably, this mounting is accomplished by means of a suitable screw 65 that may also serve as an electrical terminal for guide pin 62 as described more fully hereinafter. The mounting for guide pin 61 is similar to that shown for guide pin 62.

A capstan 66 projects outwardly of the tape deck through the opening or slot 14 in the cartridge housing (see FIG. 1). Capstan 66 is driven continuously and is employed for driving the magnetic tape 33 during recording and reproducing operations as described more fully hereinafter. It should be noted that each of spindles 26 and 46, guide pins 61 and 62, and capstan 66 is provided with a tapered end to facilitate mounting of the tape cartridge 10 on the tape deck.

Within cartridge 10, there are a series of guides for the magnetic tape 33. As shown in FIGS. 1 and 2, the retaining screw 16 projects through a spool 67 between two end flanges 68 and 69. This flanged spool construction affords an effective guide for the tape 33, as best shown in FIG. 2. A similar spool construction is utilized with respect to each of the other retaining members 15, 17 and 18 to control the position of the magnetic tape 33 within the cartridge housing. The cartridge housing also includes two corner guides, posts 71 and 72 (FIG. 1), located at the upper right and left-hand corners of the cartridge.

For effective operation, tape 33 should be maintained under limited tension during both recording and reproduction. This is achieved, in part, by means of a pair of resilient pressure members located at the lower right and left-hand corners of the cartridge as viewed in FIG. 1. The first of these pressure members comprises a leaf spring 73 having its left-hand end mounted in the cartridge housing, the right-hand or free end of the spring 73 carrying a resilient pad 74 that presses the tape 33 against the spool 67 on the retaining screw 16. A set screw 75 mounted in the cartridge housing may be adjusted to vary the pressure of pad 74 against the tape by bending spring 73 to a greater or lesser extent.

The second pressure member is located at the opposite side of the cartridge and is of similar construction. It comprises a leaf spring 76 that carries a resilient pad 77, pad 77 engaging the magnetic tape 33 as the tape passes around the spool of retaining screw 15. Pad 77, like pad 74, may be formed of felt or other suitable resilient material that is relatively firm yet soft enough to avoid harm to the tape. Again, an adjusting set screw 78 is provided to vary the curvature of the leaf spring 76 and thus adjust the pressure of pad 77 against the tape.

The assembly of cartridge 10 is a relatively simple matter. Typically, the rear or base member 12 of the housing may be placed face up, as shown in FIG. 1. The storage reel 21 is placed in position in the housing member 12 with its central hub 23 projecting through the opening 25 in the base member. The magnetic tape 33 is threaded around the spool 67, around post 71, and past the two guide spools on retainers 17 and 18 to post 72. From post 71, the tape is brought around the guide spool on retainer 15 at the lower left-hand corner of the cartridge and back to take-up reel 22. The take-up reel is mounted in the base housing member 12 with its hub located in the aligning aperture in the housing member. One or both of reels 21 and 22 can then be turned to tension the tape, and the face or front member 11 of the housing is then mounted on the cartridge. When assembled, tape 33 extends straight across the top portion of the cartridge as shown by the phantom line 33A.

To mount the cartridge on the tape deck, it is first brought into general alignment with the tape deck. Initial alignment with the tape deck is effected by mounting the two tape reel hubs 23 and 43 upon their respective spindles 26 and 46. It should be noted that the spindles project outwardly of the tape deck far enough so that accurate alignment of the two tape reels can be effected without engaging any part of the cartridge housing on any part of the aligning members of the tape deck. The tape cartridge is then pushed toward the tape deck, until contact is made with the mounting pins 55, 56, 57 and 58. As the cartridge moves toward the tape deck, the portion of the tape that extends across the open necked-down portion 13 of the cartridge engages the two guide posts 61 and 62. The tape slides over the guide posts and into alignment with the transducer head 63. Furthermore, the part of the tape extending across opening 14 engages the tapered head of capstan 66 and slides down over the tapered portion of the capstan. Thus, by the time the cartridge reaches the mounting pins 56–58, the magnetic tape 33 has been deflected around guide posts 61 and 62 and capstan 66 to approximately the position shown in solid lines in FIG. 1.

Final positioning of the cartridge on the tape deck is achieved by bringing the cartridge into registration with the four mounting pins 55–58. Because the two reels 21 and 22 are permitted to move within the cartridge housing, there need be no close-tolerance alignment between the reels and the remainder of the cartridge. Consequently, any minor variations in the fabrication of the cartridge housing do not affect mounting of the cartridge on the tape deck, as long as the housing is registerable with mounting pins 55–58. A sufficiently loose tolerance can be maintained with respect to these pins to provide for normal manufacturing variations. On the other hand, complete and accurate registration is achieved with respect to the tape reels and their respective drive spindles.

When the cartridge is being mounted on the tape deck, there may be some tendency for the magnetic tape 33 to hang up on the transducer head 63. This can be partly compensated by means of a long tapering configuration for guide pins 61 and 62. On the other hand, it may be desirable to mount a simple tapered spring guide 81 on the face of the transducer to guide the tape into the desired position relative to the transducer.

The two guide spools on retainer screws 17 and 18 afford a limiting control over the position of the tape as it extends across the central gap in the cartridge, so that the tape is accurately aligned with transducer head 63. The tension on the tape maintained by pressure members 74 and 77 prevents the development of any substantial slack in the tape, keeping tape 33 taut during insertion over guide pins 61, 62 and guide 81. This makes it possible to initiate use of the tape immediately after the cartridge is mounted on the tape deck.

Preferably, a coverplate 82 is provided for the tape deck, masking the working elements of the tape drive other than those that actually engage cartridge 10; however, no part of the drive mechanism is mounted on the cover 82. Rather, the entire drive mechanism including the cartridge is supported from the base plate 54.

Figures 3, 5:
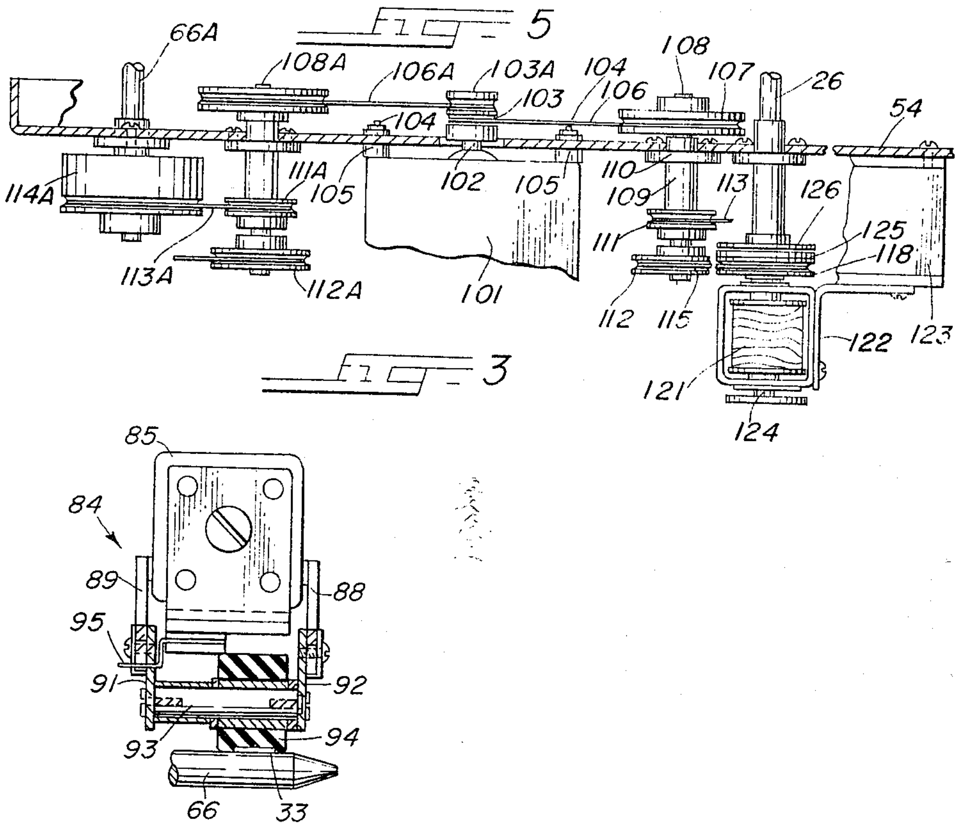
FIG. 3 is an elevation view, partly in cross section, of a part of the tape drive apparatus of FIG. 1.
FIG. 5 is a sectional view of the drive system of FIG. 4, illustrating major components of the drive in mechanical detail.

The drive for tape 33 for normal recording and reproduction operations is effected by capstan 66 and a capstan idler mechanism 84. Mechanism 84 constitutes a solenoid 85 mounted on a bracket 86 supported on base 54 and having a pivotally mounted armature member 87. Solenoid 85 may constitute the magnetic assembly of a relay. Armature 87 is provided with a bifurcated idler support comprising two arms 88 and 89 which, as shown in FIG. 3, carry a pair of shaft support members 91 and 92. An idler shaft 93 extends between the support members 91 and 92 and an idler roller 94 is journalled on the shaft. Yoke 88, 89 is biased upwardly by a spring 95.

When the operating coil 85 of idler mechanism 84 is de-energized, the mechanism is in the position shown in FIG. 1 with idler wheel 94 displaced from capstan 66. When the coil is energized, armature 87 is pivoted in a counterclockwise direction as seen in FIG. 1, moving the idler wheel to its alternate position 94A in which it presses tape 33 against capstan 66. This operating condition is illustrated in FIG. 3. As long as coil 85 remains de-energized, magnetic tape 33 is stationary; capstan 66 does not have sufficient traction to pull the tape through the cartridge with no pressure on idler 94. When the solenoid is energized, however, idler 94 moves to its position 94A and the increased frictional engagement between tape 33 and capstan 66 causes the capstan to drive the tape from reel 21 to reel 22 as described more fully hereinafter.

Figure 4:
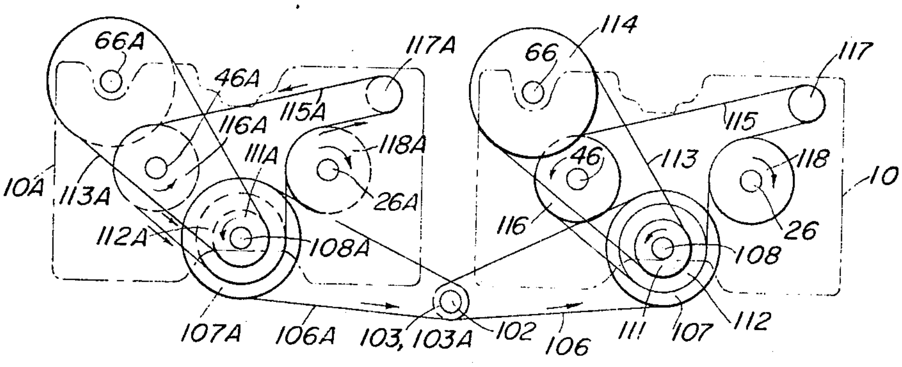
FIG. 4 is a schematic diagram of a preferred form of unified tape drive for two magnetic tape cartridges constructed in accordance with the invention.

FIGS. 4 and 5 show a preferred form of tandem drive for incorporating two of the tape cartridges of the present invention in a single magnetic recording and reproducing system. In FIG. 4, which is a schematic diagram of the drive, two cartridges 10 and 10A are shown mounted in operative position. Cartridge 10 is aligned with and engaged with the two spindles 26 and 46 and the capstan 66. Cartridge 10A is similarly aligned with and engaged with two drive spindles 26A and 46A and a capstan 66A.

The drive system of FIGS. 4 and 5 comprises a main drive motor 101 having an output shaft 102 on which two pulleys 103 and 103A are mounted. The drive motor is suspended from the support member or deck 54 by suitable means as, for example, the mounting bolts 104 and resilient spacers or grommets 105.

Pulley 103 on the motor shaft 102 is engaged by a first drive belt 106 that also engages a relatively large pulley 107 on a counter shaft 108. Shaft 108 is mounted on deck 54 by means of a counter shaft bearing sleeve 109 that is affixed to the deck through a mounting collar 110 by suitable mounting screws or bolts. Counter shaft 108 carries two additional pulleys 111 and 112, both of which are located below deck 54 as shown in FIG. 5. Pulley 111 is engaged by a drive belt 113 that also engages a combined pulley and fly wheel 114. Flywheel 114 is mounted on and is used to drive capstan 66. Pulley 112, on the other hand, is engaged by a drive belt 115 that passes around a pulley 116 associated with spindle 46, around an idler pulley 117, and around a pulley 118 that is associated with spindle 26. The two spindles 26 and 46 must be driven in opposite directions and are not driven simultaneously; consequently, it is necessary to utilize a separate clutch mechanism for each of the two spindles.

The clutch for spindle 26 is illustrated in FIG. 5. It comprises an operating coil 121 mounted upon a bracket 122 that in turn is suspended from deck 54 by means of a mounting plate 123. Coil 121 is provided with a central armature shaft 124 upon which the pulley 118 is mounted. The upper face of pulley 118 is provided with a friction surface to afford a clutch face 125. Clutch face 125 is located immediately below a friction disk 126 that is mounted upon the spindle shaft 26. When coil 121 is energized, its armature shaft 124 moves upwardly to bring clutch face 125 into engagement with the clutch disk 126 on the spindle shaft and drives the spindle shaft. This clutch mechanism is described in greater detail and is claimed in the co-pending application of Colin D. Murdoch, Serial No. 344,907, filed February 14, 1964.

A corresponding clutch arrangement is utilized for spindle shaft 46, the only difference being that the direction of rotation is opposite that for shaft 26.

The drive system for cartridge 10A is essentially similar to that for cartridge 10. Thus, and as shown in FIG. 4, the pulley 103A on the motor shaft 102 is engaged by a drive belt 106A that also engages a pulley 107A on a counter shaft 108A. As may be seen in FIGS. 4 and 5, the counter shaft 108A is provided with two additional pulleys 111A and 112A corresponding to pulleys 111 and 112 on the opposite side of the drive system. Pulley 111A drives the flywheel 114A for capstan 66A, through a belt 113A. Pulley 112A drives a belt 115A. The latter belt engages a drive pulley 116A for the clutch that controls spindle 46A and also drives a pulley 118A in the clutch mechanism for spindle 26A. As before, an idler pulley 117A is provided with the spindle drive belt 115A.

In operation of the drive system shown in FIGS. 4 and 5, drive motor 101 is driven continuously. Consequently, counter shafts 108 and 108A are rotated continuously, through their respective drive belts 106 and 106A. Shaft 108 rotates in a counterclockwise direction, as does shaft 108A.

As long as the clutches for spindles 26 and 46 are de-energized, the spindles remain stationary. Capstan 66, however, is rotated continuously through the driving connection thereto afforded by drive belt 113. As more clearly shown in connection with capstan 66A (FIG. 5), a flywheel is used for the capstan 66 so that its rotational movement will not be materially affected when the capstan idler 94 braces the tape against the capstan (see FIGS. 1 and 3). It will be seen that the drive arrangements for the two cartridges 10 and 10A are essentially identical; spindle speeds are the same in both instances and capstan speeds are also equal. Consequently, the illustrated sample drive system affords an effective and economical means for incorporating two of the tape cartridges in a single magnetic recording and reproducing system for alternate reproduction of data from, or recording of data on, the tapes in the two cartridges.

As noted above, the advancing movement of the tape for recording or reproduction is effected by engaging the idler 94 with the tape, pressing the tape against the continuously rotating capstan 66. This results in the feeding of tape from right to left, as seen in FIG. 1. To assure continuing storage of the tape on the take-up reel 22, and to prevent tangling of the tape within the cartridge, it is necessary that the clutch for spindle 46 be continuously energized. With a clutch of the kind illustrated in FIG. 5 (although this clutch is shown in association with spindle 26, it will be recalled that a similar clutch is used for spindle 46), a low-level excitation can be applied to the operating coil of the clutch. This causes the clutch to tend to drive the spindle, and the take-up reel mounted on the spindle; the current supplied to the clutch may be adjusted to apply sufficient torque to overcome the drag afforded by pressure member 77 (FIG. 1). This makes it possible to reel in the tape as it is fed by action of capstan 66 and idler 94. But the steady excitation applied to the clutch for the take-up reel should not be sufficient to exert enough torque to pull the tape through the cartridge against the further drag afforded by the second resilient pressure member 74 and by the friction of the tape against guide post 71 and the central guide posts 61 and 62. With a reasonably constant power supply, there is little difficulty in thus adjusting the continuous excitation on the clutch for spindle 46.

Substantially greater excitation is applied to the clutch for spindle 46 to cause the spindle to rotate with enough torque to overcome all of the drag in the cartridge for a rapid advancing movement of the tape, as may be required in the selection of individual recorded items on the tape for reproduction.

In some applications, it may be difficult to obtain sufficient tension on the tape by means of the pressure members 74 and 77. Under these circumstances, the operating coil 121 of the clutch for spindle 26 may also be energized at a low level so that this clutch will slip and apply additional tension to the tape. For rewinding, the clutch on spindle 46 is de-energized, relay 85 is de-energized, and the clutch on spindle 26 is fully energized.

The two conductive guide posts 61 and 62 of the tape drive system may be employed to identify the end of magnetic tape 33. Thus, the back side of the magnetic tape, near the end, is provided with a conductive coating long enough to span the two conductive guide posts. The guide posts are connected in a suitable electrical circuit for stopping the tape drive, functioning as a normally open switch. When the conductive coating reaches a point where it establishes electrical contact across the two guide posts, this "switch" is effectively closed and may be utilized to actuate a suitable control circuit for interrupting operation of motor 101. Inasmuch as a variety of different relays or other control circuits may be employed, no specific circuit is shown in the drawings.

The tape drive system shown in FIGS. 4 and 5 makes it possible to control tape movements in both of the cartridges 10 and 10A, with respect to rapid forward and reverse movements and relatively slow recording and reproducing movements, from a single motor. Accordingly, the two tape cartridges can be effectively incorporated in a magnetic recording and reproducing system that requires data from two sources without adversely affecting the accuracy of the reproduced data from either cartridge, By maintaining the construction and relationships described hereinabove in connection with FIGS. 1 through 3, both cartridges can be quickly and conveniently removed and replaced, as desired, without necessitating any movement of the associated transducer heads or any other part of the mounting apparatus such as a head pad or the like. The independently movable mounting of the individual tape reels in each cartridge provides for accurate, precise alignment of the reels on the spindles of the drive without requiring the maintenance of close precision tolerances between the reel mounts and the cartridge housings. In this connection, it should be noted that the engagement of each reel with its associated spindle should be one which aligns the reel both axially and radially on the spindle. It can be seen that this kind of alignment is achieved by the construction illustrated in FIG. 2, in which positive axial alignment is obtained by engagement of the hub 23 of the tape reel with the collar 28 on the spindle and axial alignment is afforded by a close fit between spindle 26 and hub 23 or between collar 28 and the rim flange of hub 23, or both.

FIG. 2A illustrates a modification of the mounting arrangement for supporting cartridge 10 on the tape deck that provides for improved accuracy of alignment without necessitating excessively close tolerances in manufacture. As shown therein, a spacer post 135 may be mounted on the front cartridge housing member 11 by suitable means such as a screw 136. A keeper disc 137 is mounted on spacer post 135, as by a screw 138; disc 137 is of a magnetic steel or other suitable low-reluctance magnetic material. The rear face 144 of keeper disc 137 is flush with the rear surface of cartridge housing member 12.

A mounting post 140 is mounted on base 54, by means of a screw 142. Post 140 supports a permanent magnet 139, the magnet being affixed to the post by a screw 141.

When the tape cartridge is mounted on the deck, keeper disc 137 is magnetically attracted to and firmly seated on magnet 139. Consequently, the cartridge is held firm against the mounting posts 55–58, eliminating vibration that might otherwise result from any loose tolerance fits of the cartridge on the mounting posts. Furthermore, the magnetic latch 137, 139 assures accurate spacing of the cartridge from base 54 at the center of the cartridge and thus assures accurate alignment of tape 33 against transducer head 63.

Hence, while preferred embodiments of the invention have been described and illustrated, it is to be understood that they are capable of variation and modification.

I claim:

1. Tape drive and storage apparatus for a magnetic tape recording and reproducing system comprising:
a tape cartridge comprising two tape reels mounted in tandem relation within a cartridge housing, a plurality of guides within said housing, and a magnetic tape extending from one of said reels around said guides to the other of said reels, in a substantially U-shaped path,
said tape reels being movable both axially and laterally within said housing and each having an axial bore aligned with openings in opposed walls of said housing,
said cartridge having first and second openings along the bight of said U-shaped path across which first and second portions of said tape extend;
a rigid support deck;
tape guide means comprising a pair of spaced guide posts having tapered ends mounted on said deck and projecting outwardly thereof for a given length;
a capstan, having a tapered end, mounted on said deck in spaced relation to said guide means and projecting outwardly thereof for a similar length;
and a pair of spindles, having tapered ends, mounted on said deck and projecting outwardly thereof for a substantially greater length than said guide posts and said capstan, the positions of said spindles, said guide posts, and said capstan corresponding to the positions of said housing apertures, said first opening, and said second opening in said cartridge, respectively;
said cartridge being initially mounted in accurate alignment on said spindles by first engaging said spindles in said axial bores of said tape reels and subsequently moving said cartridge toward said deck to engage said guide posts and said capstan with said first and second portions, respectively, of said tape.

2. Tape drive and storage apparatus for a magnetic tape recording and reproducing system comprising:
a pair of tape cartridges each comprising two tape reels mounted in tandem relation within a cartridge housing, a plurality of guides within said housing, and a magnetic tape extending from one of said reels around said guides to the other of said reels,
said tape reels in each cartridge being movable both axially and laterally within said housing and each having an axial bore aligned with openings in opposed walls of said housing,
said cartridges each having first and second openings across which first and second portions of said tape extend;
a support deck;
two tape guide means mounted on said deck and each including a pair of guide posts projecting outwardly thereof for a given length;
two capstans mounted on said deck, one in predetermined spaced relation to each said guide means, and projecting outwardly thereof for a similar length;
two pairs of spindles mounted on said deck and projecting outwardly thereof for a substantially greater length than said tape guide means and said capstan, the positions of each pair of said spindles corresponding to the positions of said housing apertures in one of said cartridges, said cartridges each being initially mounted on said spindles by first engaging one pair of said spindles in said axial bores of said tape reels and subsequently moving said cartridge toward said deck to engage said tape guide means and said capstan with said first and second portions, respectively, of said tape;
a motor;
a pair of counter shafts driven at equal speeds by said motor;
and drive means coupling one pair of spindles and one capstan to each of said counter shafts, said drive means including an electrically operated magnetic clutch for each spindle.

3. Tape drive and storage apparatus for a magnetic tape recording and reproducing system comprising:
a tape cartridge comprising two tape reels mounted in tandem relation within a cartridge housing, a plurality of guides within said housing, and a magnetic tape extending from one of said reels around said guides to the other of said reels,
said tape reels being movable both axially and laterally within said housing and each having an axial bore aligned with apertures in opposed walls of said housing,
said cartridge housing having a plurality of recesses for receiving support posts and further having at least one opening exposing a portion of said tape;
a support deck;
a plurality of support posts projecting outwardly of said deck for a given distance;
tape guide means projecting outwardly of said deck for a greater distance;
a capstan projecting outwardly of said deck for a distance approximating that of said tape guide means;
a pair of spindles mounted on said deck and projecting outwardly thereof for a substantially greater distance than said tape guide means and said capstan, the positions of said spindles corresponding to the positions of said housing apertures in said cartridge,
said cartridge being initially mounted in accurate alignment on said spindles by first engaging said spindles in said axial bores of said tape reels and subsequently moving said cartridge toward said deck to engage said tape guide means and said capstan with said exposed portion of said tape and to engage said support posts in said cartridge housing recesses;
and magnetic aligning means comprising a permanent magnet member mounted on said tape deck and a keeper member of magnetic material mounted on said cartridge housing, said magnetic members engaging each other to hold said cartridge housing in firm aligned position on said support posts.

References Cited by the Examiner

UNITED STATES PATENTS

| | | | |
|---|---|---|---|
| 2,778,637 | 1/1957 | Eash | 242—55.13 X |
| 2,926,861 | 3/1960 | Murdoch | 242—55.13 |
| 2,989,261 | 6/1961 | Gillette et al. | 242—55.13 |
| 3,136,207 | 6/1964 | Flad et al. | 242—55.13 X |
| 3,167,267 | 1/1965 | Crane | 242—55.13 |

FRANK J. COHEN, *Primary Examiner.*

LEONARD D. CHRISTIAN, MERVIN STEIN, *Examiners.*